(12) United States Patent
Duhain et al.

(10) Patent No.: US 12,366,005 B2
(45) Date of Patent: Jul. 22, 2025

(54) HIGHLY COMPACT METAL-CNT COMPOSITES AND MANUFACTURE THEREOF

(71) Applicant: LUXEMBOURG INSTITUTE OF SCIENCE AND TECHNOLOGY (LIST), Esch sur Alzette (LU)

(72) Inventors: Antoine Duhain, Esch sur Alzette (LU); Guillaume Lamblin, Esch sur Alzette (LU); Damien Lenoble, Esch sur Alzette (LU)

(73) Assignee: LUXEMBOURG INSTITUTE OF SCIENCE AND TECHNOLOGY (LIST), Eschsur-Alzette (LU)

( * ) Notice: Subject to any disclaimer, the term of this patent is extended or adjusted under 35 U.S.C. 154(b) by 0 days.

(21) Appl. No.: 18/268,516

(22) PCT Filed: Nov. 29, 2021

(86) PCT No.: PCT/EP2021/083348
§ 371 (c)(1),
(2) Date: Jun. 20, 2023

(87) PCT Pub. No.: WO2022/135841
PCT Pub. Date: Jun. 30, 2022

(65) Prior Publication Data
US 2024/0309535 A1    Sep. 19, 2024

(30) Foreign Application Priority Data

Dec. 21, 2020 (LU) .................................. LU102334

(51) Int. Cl.
*C25D 5/54* (2006.01)
*C01B 32/174* (2017.01)
*C25D 3/38* (2006.01)
*C25D 5/20* (2006.01)

(52) U.S. Cl.
CPC .............. *C25D 5/54* (2013.01); *C01B 32/174* (2017.08); *C25D 3/38* (2013.01); *C25D 5/20* (2013.01);
(Continued)

(58) Field of Classification Search
CPC ............ C01B 2202/00; C01B 2202/02; C01B 2202/06; B82Y 30/00; B82Y 40/00;
(Continued)

(56) References Cited

U.S. PATENT DOCUMENTS

2007/0145097 A1* 6/2007 Suh .................. B82Y 10/00
228/101
2010/0047564 A1 2/2010 Kim et al.
(Continued)

FOREIGN PATENT DOCUMENTS

CN  110331318 A  * 10/2019  ................ B22F 3/04
WO  2020043590 A1    3/2020

OTHER PUBLICATIONS

Chen translation CN110331318A (Year: 2019).*
(Continued)

*Primary Examiner* — Tri V Nguyen
(74) *Attorney, Agent, or Firm* — CANTOR COLBURN LLP

(57) ABSTRACT

A method for manufacturing metal-CNT composites is disclosed. The method comprises providing an agglomerate of CNTs, filling interstices of the CNT agglomerate in a plating solution, so as to form a metal phase, in which the CNTs are embedded. The CNT agglomerate is compressed with a clamping appliance when the metal phase is formed. A further aspect of the invention relates to metal-CNT composites with high CNT content.

15 Claims, 7 Drawing Sheets

(52) U.S. Cl.
    CPC ...... *C01B 2202/06* (2013.01); *C01B 2202/22* (2013.01); *C01B 2202/34* (2013.01); *C01P 2004/50* (2013.01)

(58) Field of Classification Search
    CPC ... C25D 5/18; C25D 5/20; C25D 5/54; C25D 7/00; C01P 2004/50
    USPC ................................................. 252/503, 510
    See application file for complete search history.

(56) References Cited

U.S. PATENT DOCUMENTS

| | | | | |
|---|---|---|---|---|
| 2013/0299212 A1* | 11/2013 | Hata | ........................ | C25D 5/54 174/126.2 |
| 2020/0131661 A1* | 4/2020 | Copic | ................... | H01M 4/666 |
| 2022/0148764 A2* | 5/2022 | Franks | ................... | H01B 1/026 |

OTHER PUBLICATIONS

A. Azarniya, et al, "Physicomechanical properties of spark plasma sintered carbon nanotube reinforced metal matrix nanocomposites", Progress in Materials Science 90 (2017) 276-324.

Huiqing Wu, "Composite Electrodeposition of Zinc and Carbon Nanotubes", Proceedings of the 1st IEEE International Conference on Nano/Micro Engineered and Molecular Systems, Jan. 18-21, 2006.

International Search Report for corresponding application PCT/EP2021/083348 filed Nov. 29. 2021; Mail date Jan. 21, 2022.

Written Opinion for corresponding application PCT/EP2021/083348 filed Nov. 29. 2021; Mail date Jan. 21, 2022.

International Preliminary Report on Patentability for corresponding application PCT/EP2021/083348 filed Nov. 29. 2021; Mail date Mar. 31, 2023.

* cited by examiner

HIGHLY COMPACT METAL-CNT COMPOSITES AND MANUFACTURE THEREOF

FIELD OF THE INVENTION

The invention generally relates to metal-carbon nanotube composites (metal-CNT composites) and methods for producing such composites.

BACKGROUND OF THE INVENTION

Due to the ongoing trend to miniaturization in microelectronics, more and more conductors operate close to their maximum current-carrying capacity. The maximum current density that a material can withstand without damage on its functional properties is referred to as "ampacity". Operating conductors close to their ampacity limit leads to decreased lifetime of electronic devices. Consequently, increased research efforts are made to develop materials with similar electrical conductivities as copper, silver or gold but having higher ampacity. Such materials could also be used in various domains, like lightning strike protection (especially when the weight of the materials or the structure is critical, e.g. in airplanes, wind turbines, space systems, etc.), in the automotive field (e.g. as cathode current collectors), in microelectronics, power electronics and so on.

Metal-carbon nanotube composites have been devised as particularly promising materials in the above respect. Carbon nanotubes (CNT) have received a lot of interest since the publications of S. Iijima in the 1990s (e.g. Iijima S., "Helical microtubules of graphite carbon," Nature 1991; 354:56-8 and Iijima S, Ichihashi T., "Single-shell carbon nanotubes of 1-nm diameter," Nature 1993; 363:603-5). Scientific work on integration of CNTs into a copper matrix is ongoing. An overview of the most common manufacturing routes, i.e., based on powder metallurgy, electroplating or electroless deposition, may be found in Janas D., Liszka B., "Copper matrix nanocomposites based on carbon nanotubes or graphene," Mater. Chem. Front., 2018, 2, 22-35. As indicated in that publication, a difficulty that one encounters in the above methods resides in the inherent "cuprophobic" nature of the CNTs. As regards the electroplating technique, it is particularly difficult to achieve a good filling of the interstices between the CNTs with copper due to the high hydrophobicity of the CNTs.

High ampacity and high electrical conductivity are generally mutually excluded properties. The first needs a strongly bonded system while the second needs a weakly bonded system. One potential way to combine both properties is to use a composite of two materials exhibiting high ampacity and high electrical conductivity respectively. Subramaniam et al., Nature communications 4 2202 (2013), used CNTs for their high ampacity and copper for its high conductivity and obtained outstanding results (conductivity roughly as in copper but an ampacity about 100 times higher than for copper). Besides demonstrating improved ampacity, Subramaniam et al. showed that their composite also exhibited a lower dependence of electrical conductivity on temperature than copper. The Cu-CNT composite had exhibited thermal conductivity of 395 W $m^{-1}$ $K^{-1}$ (which is close to that of copper: 400 W $m^{-1}$ $K^{-1}$) and a low thermal expansion coefficient (5 ppm $K^{-1}$), similar to that of silicon. The combination of these two properties leads to a value of the thermal distortion parameter (TDP), which characterizes the thermal stability of a material, TDP=CTE/K (where K is the thermal conductivity and CTE the thermal expansion coefficient), comparable to that of silicon, which is the lowest one of all available materials. As mentioned previously, achieving a satisfactory filling of the interstices between the CNTs with copper (or other metals) is a difficult task due to the high hydrophobicity of the CNTs. Subramaniam et al. used a two-step approach: a first electroplating step was made using an organic solution of acetonitrile and copper acetate; in a second step, electroplating was carried out with a typical electroplating solution. In detail, an impregnation step of the CNTs in acetonitrile-copper acetate solution was carried out for nucleation of Cu seeds, followed by electroplating in the same solution at 5 mA/$cm^2$. The resulting intermediate product was washed with acetonitrile and dried 30 minutes at 60° C. in a vacuum desiccator. Then an annealing step at 250° C. during 3 h in a tube furnace was performed, followed by cooling under $H_2$ at 150 sccm. This was then followed by electroplating in a $CuSO_4$ solution to fill the interstices and the same drying and annealing steps were repeated.

WO 2020/043590 A1, to Luxembourg Institute of Science and Technology (LIST), incorporated herein by reference in its entirety, discloses a different approach: a layer of CNTs, coated with polyphenol or poly(catecholamine), is provided and the interstices of the CNT layer are then filled with a metal matrix, such that the CNT become embedded therein. Polyphenol and poly(catecholamine) are hydrophilic and have redox activity (i.e. are capable of reducing metal ions). The filling is achieved by electrodeposition or by electroless deposition. The polyphenol or poly(catecholamine) coating is crosslinked by metal ions, the metal ions promoting, as metal seeds, adhesion and/or growth of the metal matrix during the filling step.

SUMMARY OF THE INVENTION

A first aspect of the present invention relates to manufacturing of metal-CNT composites, in particular, but not exclusively to Cu-CNT composites. According to this first aspect, a method for producing a metal-CNT composite material comprises providing an agglomerate of CNTs, filling interstices of the CNT agglomerate by deposition of metal from a plating solution, so as to form a (continuous) metal phase, in which the CNTs are embedded. The CNT agglomerate is compressed with a clamping appliance when the metal phase is formed (during the deposition process).

As used herein, the expression "clamping appliance" (briefly "clamp") designates an appliance having mechanical parts (e.g. plates, claws or mould parts) brought together for holding something (in this case the CNT agglomerate).

The expression "carbon nanotubes agglomerate" (or "CNT agglomerate") herein designates a three-dimensional cluster or accumulation of CNTs in generally disordered arrangement. Alternative expressions would be "CNT tangle" or "CNT gallimaufry". Preferably, the CNTs of the agglomerate are randomly oriented, such that the CNT agglomerate resembles a thicket rather than a so-called CNT "forest" wherein the CNT are generally aligned in parallel. It should be noted that perfect randomness of the orientations of the CNTs within the CNT agglomerate (implying isotropy) is not a requirement but may be advantageous for specific applications.

The compression of the CNT agglomerate with the clamping appliance is preferably carried out in such a way that it inhibits or prevents swelling of the CNT agglomerate during formation of the metal phase. It has been noted by the inventors of the present invention that immersing a CNT agglomerate in plating solution results in swelling of the CNT agglomerate, i.e. an increase of the volume of the interstices (pores). This swelling then has the consequence that the volume fraction of the CNTs in the metal-CNT composite is low (well below 10%). It has been observed that compressing the CNT agglomerate before introducing it into the plating solution ("pre-compression") does not allow obtaining a higher volume fraction. Indeed, it was found that the degree of pre-compression of a CNT agglomerate layer had essentially no impact on the thickness of the metal-CNT composite obtained after plating. In other words, the higher the pre-compression, the more important was the swelling during the plating process.

The method allows improving the density of CNTs in composite Cu-CNT materials, in particular in thin-film Cu-CNTs composites. This means that, for a given film thickness, the overall material density of the metal-CNT composite can be reduced, without arriving at highly porous nanocomposites. Indeed, this invention enables high CNT incorporation into almost void-free Cu-CNT composites (highly compact composite Cu-CNT materials).

The clamping appliance allows electroplating in unprecedented conditions, e.g. electroplating under (ultra)sonication. Without the clamping system, the CNT agglomerate would be destroyed by the (ultra)sound waves and dispersed into the solution. The (ultra)sonication during the electroplating may improve the migration of ions into the CNT agglomerate, potentially increasing the maximum electroplating rate.

The clamping appliance furthermore allows ensuring a good contact of the CNT agglomerate with the substrate, if any. In the case of a conductive substrate, metal growth is bottom-up (initiated at the substrate). In this case, if the CNT agglomerate is not in good contact with the substrate, unwanted growth inhomogeneity and thus porosity may result. In the same way, the clamping appliance can help to overcome the potential hydrophilic problem one can encounter with CNT agglomerates, which may lead to CNT delamination/explosion upon immersion of the CNT agglomerates aqueous solutions.

Finally, for a given density of current (or, equivalently, for a given deposition rate), the higher density of CNTs in the agglomerate resulting from the compression leads to a smaller volume of copper to be deposited and thus decreases the time of 2 s deposition in comparison with a less dense (uncompressed) CNT agglomerate of the same volume (i.e. with lower CNT vol. %). As a corollary, the present method allows easier (quicker) to fabrication of thicker composite Cu-CNT materials.

The CNTs used in the context of the proposed method preferably comprise hydrophilic coatings. The CNTs or the CNT agglomerate could initially be provided in the form of a CNT tissue (packaged in dry form or in a liquid medium). Alternatively, hydrophilization of the CNTs could be part of the process. The hydrophilic coating preferably comprises polyphenol or poly(catecholamine). More preferably, the hydrophilic coating comprises metal ions that crosslink the polyphenol or the poly(catecholamine) and/or that are chelated by the polyphenol or the poly(catecholamine). Examples of polyphenol and poly(catecholamine) are tannic acid and polydopamine, respectively. Polyphenol and poly (catecholamine) are hydrophilic and have redox activity (i.e. are capable of reducing metal ions). Specifically, they are capable of chelating and/or crosslinking with metal ions. Another property that makes these substances interesting in the present context is their ability to coat CNT due to $\pi$-$\pi$ interaction.

If hydrophilization of the CNTs is part of the process, coating of the CNTs is preferably carried out in a solution containing phenol and/or catecholamine moieties wherein initially uncoated CNTs are dispersed. Preferably, the solution also contains a certain amount of metal ions capable of crosslinking the phenol and/or catecholamine moieties and/or of forming chelates with them. The coating of the CNT may be carried out under sonication, e.g. under ultrasonication, and/or under stirring. The solution may further comprise one or more catalysts, buffering agents, etc. The CNTs are preferably oxidized prior to dispersion in the solution containing the phenol and/or catecholamine moieties.

It is worthwhile noting that after formation of the metal phase, the hydrophilic coating of the CNTs could be destroyed, e.g. in an annealing step.

Preferably, the metal comprises copper (Cu). Nevertheless, other metals may be used as well (instead or in combination with copper). Preferred metals (other than copper) include: Ag, Au, Sn, Zn, Cd, Cr, Ni, Pt, Pb, Pd, Co, Ti, Fe, and alloys thereof.

The clamping appliance preferably comprises a first and a second plate holding the CNT agglomerate there between. The plates may be flat or curved; their shape may be selected depending on the shape to be given to the metal-CNT composite. The materials used for the plates are preferably selected among electrically insulating materials. Preferred materials include polylactid acid, PEEK (polyetheretherketone), PTFE and/or PEEK/PTFE composites. The surface of the plate(s) in contact with the CNT agglomerate could be conductive. One or both of the first and a second plates could comprise perforations or other passageways for the plating solution and the metal ions contained therein. The clamping appliance may be closed and held closed pneumatically, hydraulically and/or mechanically, e.g. by one or more tightening screws, a spring mechanism, etc. Various types of clamps and various locking mechanisms can be envisaged as only moderate pressure is necessary to prevent the CNT agglomerate from swelling during the deposition. The clamping appliance could be integrated with an electroplating chuck.

Preferably, at least one of the first and second plates comprises a patterned pressure-transfer face turned towards the CNT agglomerate, the patterned pressure-transfer face comprising raised areas and recessed areas, the recessed areas communicating with the passageways.

Compression of the CNT agglomerate may be effected at least predominantly (or exclusively) via the raised areas, leading to higher compaction in regions of the CNT agglomerate opposite the raised areas, to less compaction in regions of the CNT agglomerate opposite the recessed areas and to formation of the metal phase at least predominantly (or exclusively) within the less compacted regions of the CNT agglomerate, i.e. opposite the recessed areas.

The method may comprise releasing the CNT agglomerate from the clamping appliance and rinsing the carbon nanotubes from the previously more highly compacted regions that are less or not impregnated with the metal phase.

Optionally, a membrane may be arranged between at least one of the first and second plates and the CNT agglomerate, the membrane being permeable for the plating solution. The membrane could be a semi-permeable membrane if the CNT agglomerate is properly wetted by the solvent. The permeable membrane may serve to delimit the volume within which the metal phase may grow. If the growth rate of the metal phase is significantly higher in certain areas of the CNT agglomerate, the metal may locally begin to grow into any pores or recesses in adjacent layers while in other areas, the filling of the interstices between the CNTs is still incomplete. The porous membrane may thus help to protect the plates of the clamping appliance and/or other intermediate layers against intrusion by the metal phase. If the clamping appliance comprises one or more embossed plates, the permeable membrane may further help to distribute the compressive stress into regions of the CNT agglomerate located opposite recessed areas of the embossed plate(s). The membrane could, for example, be based on polycarbonate, polyethylene terephthalate, polylactic acid, polysulfone, PTFE (in particular, hydrophilic PTFE), or other polymers. The membrane may be configured as a disposable layer: should the membrane become attached to the metal-CNT composite (due to metal growth into the pores of the membrane), it may be removed from the metal-CNT composite in any suitable (destructive or non-destructive) way. The membrane could be removed mechanically, by peeling it off, by grinding, by milling, by polishing, etc., chemically, e.g. using a solvent (e.g. by immersion in dichloromethane in case of a polycarbonate membrane), and/or by heat (e.g. pyrolytically).

In addition to a membrane, a capillary layer (with greater pores than the membrane, e.g. a tissue) could be used between the membrane and the plate of the clamping appliance. Such a capillary layer would serve the purposes of enhancing distribution of the plating solution into the CNT agglomerate (in particular, perpendicularly to the direction of the pressure) and to mechanically reinforce the membrane (so that the system of the membrane and the capillary layer efficiently confines the volume of the CNT agglomerate. In particular, the membrane may help to homogenise the growth rate of the metal phase (which tends to be higher at the sides of the CNT agglomerate than in its centre. In a compressive system comprising both a membrane and a capillary layer, the capillary layer (with the greater pores) would be arranged on the side of the membrane that faces away from the CNT agglomerate. The role of the membrane in such a system is to reduce the pore size that the CNTs "see", so that the CNT agglomerate cannot actually swell into the small pores. If the membrane were removed, the CNTs would swell into the pores of the capillary layer, which would become firmly encrusted within the composite. The combination of a capillary layer and a membrane may favour the creation of continuous ultradense metal-CNT composites.

Preferably, filling the interstices of the CNT agglomerate in the plating solution is carried out by electroplating (also: electrodeposition) or by electroless deposition.

A further aspect of the invention relates to a metal-CNT composite material as may be obtained by the described method. The metal-CNT composite material comprises a CNT agglomerate embedded in a (continuous) metal phase occupying the interstices of the CNT agglomerate. The CNT content of the metal-CNT composite material amounts to at least 10% by volume, preferably to between 15% and 65% by volume. According to an embodiment, the metal-CNT composite material could contain at least 45% volume of carbon nanotubes.

As indicated previously, the metal-CNT composite material is preferably highly compact, i.e. essentially free of voids (pores). The metal-CNT composite material preferably has a porosity of 5% or less, more preferably of 3% or less, still more preferably of 2% or less and most preferably of 1% or less. The porosity is preferably determined by micro/nano-computed tomography (micro/nano CT).

Preferably, wherein the carbon nanotubes agglomerate includes a mix of short and long carbon nanotubes, at least 30% by weight of the carbon nanotubes being short carbon nanotubes with lengths in the range from 2.5 µm to 50 µm and at least 30% by weight of the carbon nanotubes being long carbon nanotubes with lengths in the range from 75 µm to 1500 µm. The long carbon nanotubes more preferably have lengths in the range from 200 µm to 800 µm. The short CNTs have diameters preferably from 5 to 30 nm, more preferably from 5 to 20 nm and yet more preferably from 6 to 13 nm. The long CNTs preferably have diameters from 50 to 100 nm, e.g. 80 nm. A mix of long and short CNTs may be very advantageous to achieve a dense agglomerate of carbon nanotubes because the shorter CNTs may lodge themselves in the interstices of the longer CNTs. Such a dense CNT agglomerate may then lead to a higher volume percentage of CNTs within the composite.

The metal-CNT composite material may take any geometrical shape; preferably, however, it takes the form of a mesh (e.g. a hexagonal mesh, a rectangular grid, a regular or irregular network, or the like).

In the present document, the verb "to comprise" and the expression "comprised of" are used as open transitional phrases meaning "consist at least of" or "include". Unless otherwise implied by context, the use of singular word form is intended to encompass the plural, except when the cardinal number "one" is used: "one" herein means "exactly one". Ordinal numbers ("first", "second", etc.) are used herein to differentiate between different instances of a generic object; no particular order, importance or hierarchy is intended to be implied by the use of these expressions. Furthermore, when plural instances of an object are referred to by ordinal numbers, this does not necessarily mean that no other instances of that object are present (unless this follows clearly from context). For instance, in an embodiment wherein the clamping appliance comprises a first and a second plate, the presence of further plates, e.g. a third and a fourth plate, is not automatically excluded. However, the use of a clamping appliance comprising only a first and a second plate to hold and compress the CNT agglomerate may be considered advantageous for reasons of simplicity and ease of implementation.

BRIEF DESCRIPTION OF THE DRAWINGS

By way of example, preferred, non-limiting embodiments of the invention will now be described in detail with reference to the accompanying drawings, in which.

DETAILED DESCRIPTION OF PREFERRED EMBODIMENTS

Figure 1:
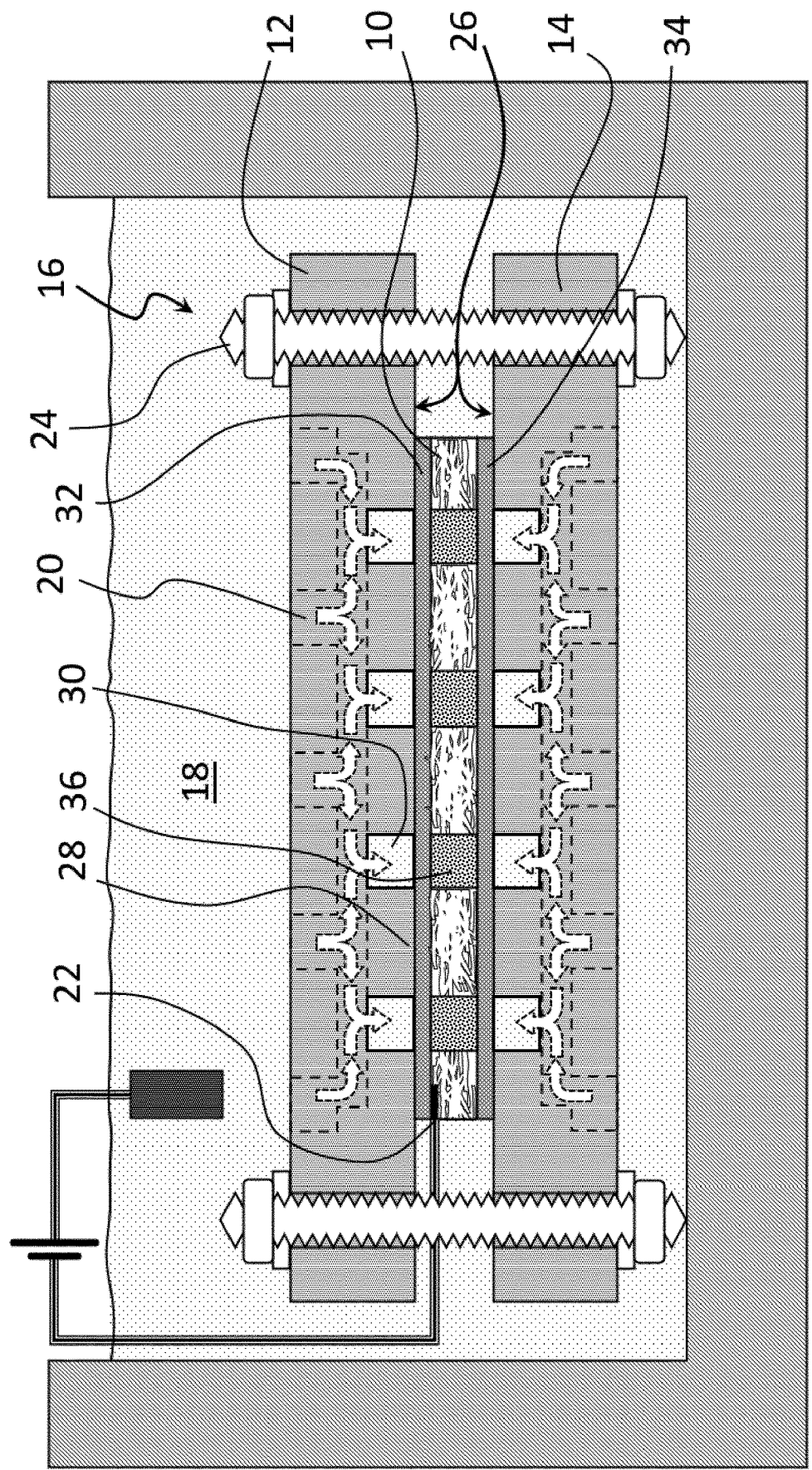
FIG. 1: is a schematic cross-sectional view of a first clamping appliance holding a CNT agglomerate immersed in an electrodeposition bath.

According to an embodiment of the invention, a CNT agglomerate in the form of a tissue (non-woven) of polydopamine-coated CNTs is provided. Alternatively, the CNT tissue is deposited onto one or two faces of an electrically conductive or insulating substrate. As illustrated in FIG. 1, the CNT agglomerate 10 is clamped between a first 12 and a second plate 14 of a clamping appliance 16, which is then immersed in a plating solution 18. The plates 12, 14 (both made of isolating material) of the clamping appliance 16 have passageways 20 therein, such that the plating solution 18 can come into contact with and that the metal ions may migrate to the CNT agglomerate 10. The CNT agglomerate 10 is electrically contacted with a working electrode terminal 22 and the interstices of the CNT agglomerate 10 are then filled with the metal phase 36, such that the CNTs become embedded therein. During the electrodeposition process, the clamping appliance 16 maintains the CNT agglomerate 10 compressed, such that swelling thereof is prevented or at least inhibited.

It is worthwhile noting that high pressures are not necessary, such that the plates 12, 14 of the clamping appliance and the tightening screws 24 could be made of plastic or like materials. A particularly convenient way to fabricate the plates would be by additive manufacturing ("3D printing").

Each of the first and second plates 12, 14 comprises a patterned pressure-transfer face 26, turned towards the CNT agglomerate 10, with raised areas 28 and recessed areas 30. The recessed areas 30 fluidly communicate with the passageways 20. The raised areas 28 serve to transfer pressure on the CNT agglomerate 10. A first porous membrane 32 is arranged between the pressure-transfer face of the first plate 12 and the CNT agglomerate 10, a second porous membrane 34 is arranged between the pressure-transfer face of the second plate 14 and the CNT agglomerate 10. The membranes 32, 34 are permeable for the metal ions contained in the plating solution 18 and further serve to distribute the pressure more homogeneously on the CNT agglomerate 10 (and thus to confine the CNT agglomerate also in regions facing the recessed areas 30). The membranes could, e.g. be hydrophilic PTFE membranes with 10 µm pore size, around 80% porosity and a thickness of 85 µm. Highly porous membranes (porosity>60) may be preferred to facilitate ion mass transfer. Pore size is preferable selected small enough to avoid swelling of the CNTs into the pores but a compromise may be made to ascertain acceptable growth rate of the metal phase. Also, hydrophilic membranes may be preferred: in tests, hydrophilic membranes performed better than other candidate membranes.

Figure 7:
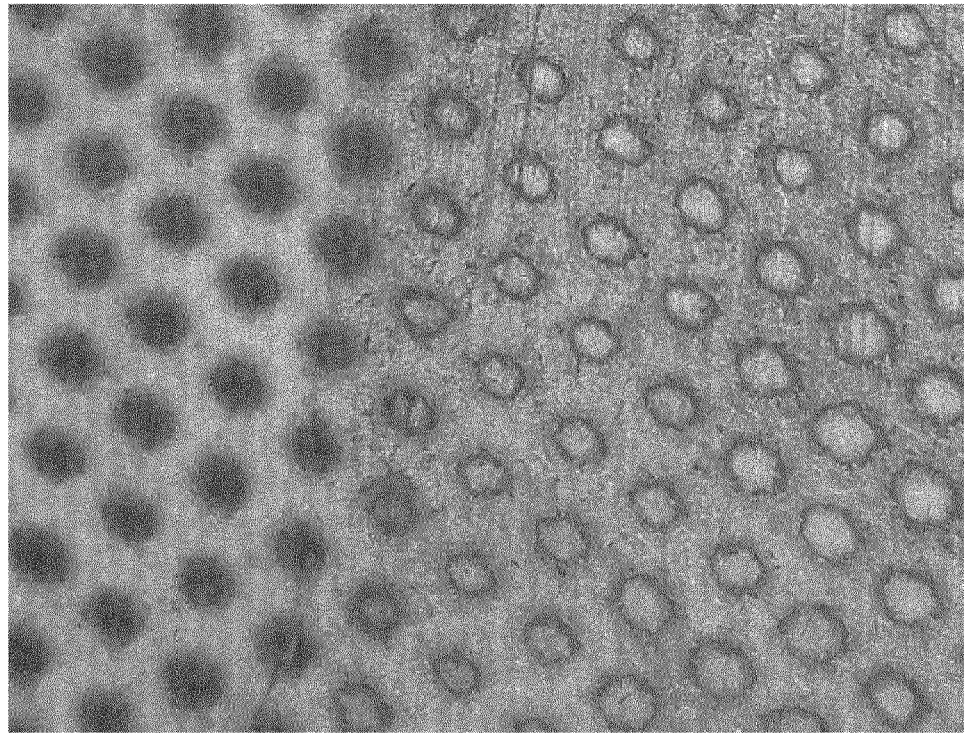
FIG. 7: is a photograph of a patterned Cu-CNT composite, obtained in accordance with the present invention, exhibiting regions wherein the CNT agglomerate has remained unplated (dark dots on the left-hand side: before rinsing the CNTs away; light dots on the right-hand side: after removing the CNTs with a wipe soaked with ethanol)
Figure 8:
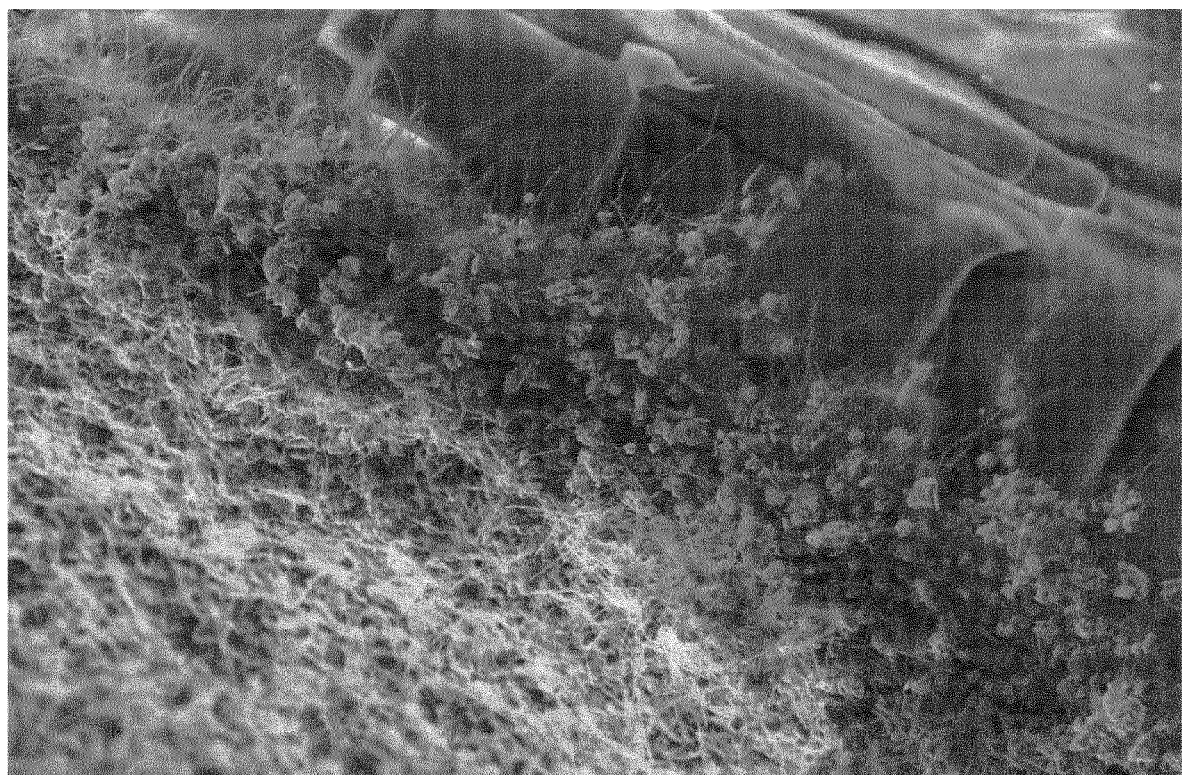
FIG. 8: is a SEM cross section of a patterned Cu-CNT composite, showing an unplated region from which the CNTs can be rinsed away.
Figure 9:
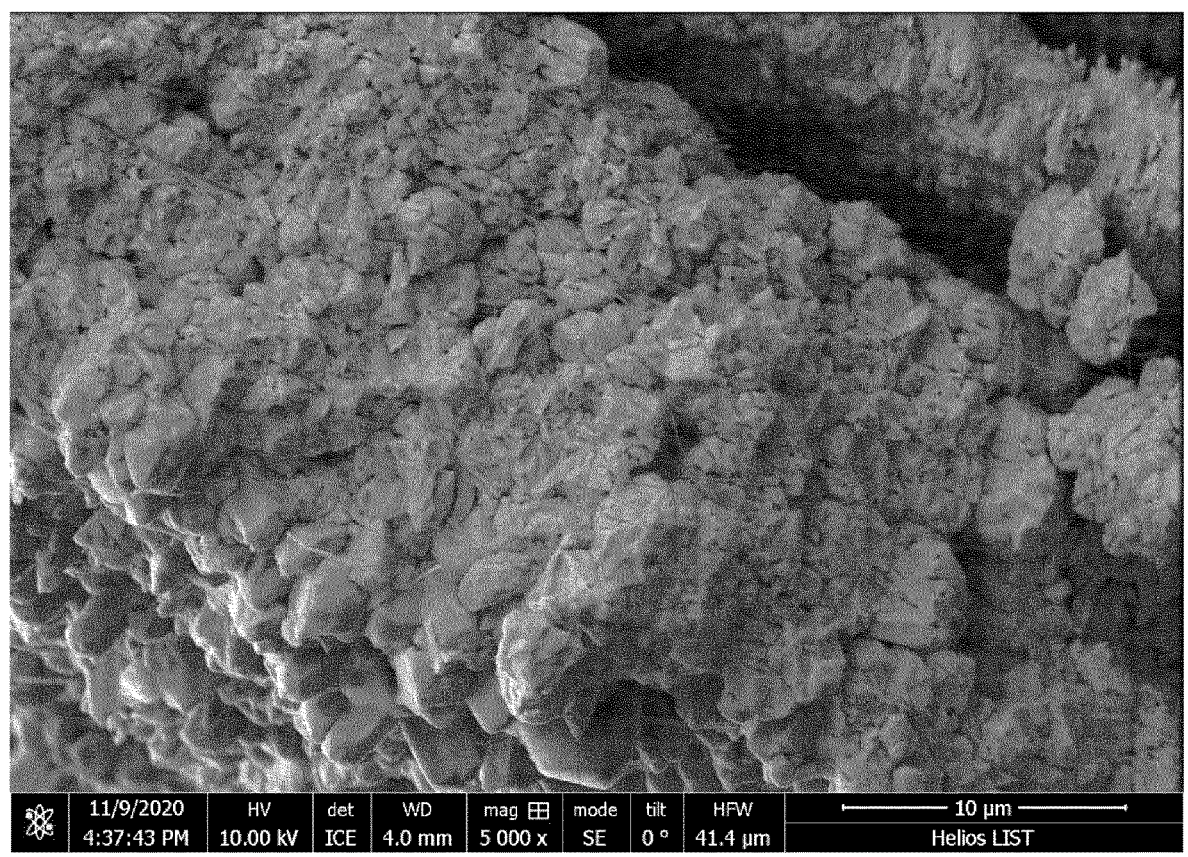
FIG. 9: is a SEM picture of a Cu-CNT composite region densely filled with copper.

Due to the patterned pressure-transfer faces 26, compression of the CNT agglomerate occurs predominantly opposite the raised areas 28, which leads to higher compaction in those regions of the CNT agglomerate 10. Although the membranes transfer part of the pressure also into the regions of the CNT agglomerate 10 opposite the recessed areas 30, these regions are less compacted (lower CNT density and wider interstices). Consequently, formation of the metal phase 36 takes place predominantly within the less compacted regions of the CNT agglomerate 10, i.e. opposite the recessed areas 30. Thanks to the patterned pressure-transfer faces 26, the ratio between metal and CNTs can thus be spatially modulated. By adjusting the process parameters (exerted pressure, type of membrane, deposition time, thickness of the CNT agglomerate, etc.) one may obtain a metal-CNT composite wherein the highly compacted regions are so little impregnated with the metal phase that after removal of the CNT agglomerate from the clamping appliance and from the plating bath, the CNTs can be rinsed away, leaving a patterned metal-CNT composite (e.g. a mesh or shaped pieces). FIG. 7 is a picture of a patterned metal-CNT composite. The left-hand side of FIG. 7 shows a portion of the composite as retrieved from the electroplating bath, while the right-hand side shows a portion wherein the CNTs have been removed from the unplated regions using a tissue wetted with ethanol. FIGS. 8 and 9 are SEM pictures of an unplated region and a plated region of a patterned metal-CNT composite, respectively.

It may be worthwhile noting that one or both membranes 32, 34 may not be needed in all applications.

Figure 2:
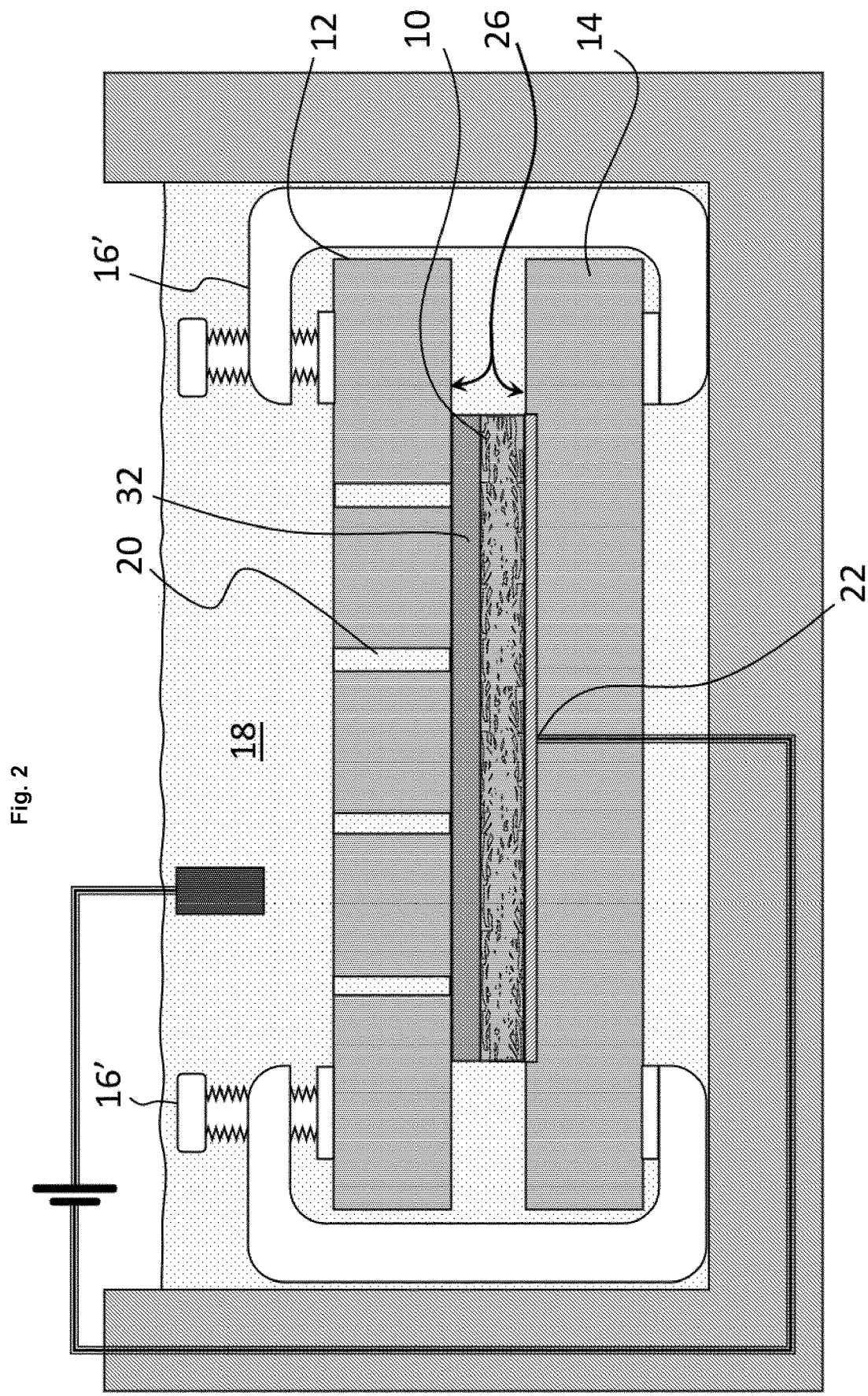
FIG. 2: is a schematic cross-sectional view of a second clamping appliance holding a CNT agglomerate immersed in an electrodeposition bath.

FIG. 2 illustrates an alternative setup, which differs from the setup of FIG. 1 in several aspects. With the setup of FIG. 2, one aims at a substantially uniform distribution of the metal phase throughout the CNT agglomerate 10. The first and second plates 12, 14 are in this setup held together by C-clamps 16'. The second plate 14 has a conductive pressure-transfer face 26, which is contacted by the working electrode terminal 22 of the voltage source. The CNT agglomerate 10 rests directly on the second plate 14 (i.e. there is no porous membrane between the CNT agglomerate and the pressure-transfer face 26 of the second plate).

Only the first plate 12 of the clamping appliance has passageways 20 therein, such that the plating solution 18 can come into contact with and that the metal ions may migrate to the CNT agglomerate 10. The pressure-transfer face 26 of the first plate 12 is essentially flat, i.e. the areas of the passageway openings are relatively small. A porous membrane 32 is arranged between the pressure-transfer face 26 of the first plate 12 and the CNT agglomerate 10 in order to distribute both the pressure and the metal ions homogeneously on the CNT agglomerate 10.

Examples

A. Production of CNTs Coated with Polydopamine Crosslinked with Copper Ions 100 mg of oxidized CNTs were added to 625 ml of a solution comprised of dopamine hydrochloride solution (DA, 0.1 mg/ml) and $CuSO_4.5H_2O$ (0.6 mg/ml). The solution was ultra-sonicated during 10 s, then left under vigorous stirring for 30 minutes. 375 ml of Tris-HCl (10 mM) were added to the solution. The solution was ultrasonicated during 10 s and then left under vigorous stirring for 24 hours. 12.5 ml of NaOH (1 M) were added and the solution was filtrated. The filtrated CNTs were then dispersed in EtOH (ethyl alcohol). The resulting CNTs were coated with polydopamine (Pda) crosslinked with copper ions.

The CNTs used in this example were multi-walled CNTs (MWCNTs) with lengths from 2.5 µm to 8 µm (6-13 nm diameter), and/or with length around 200 µm (5-30 nm diameter) and/or with lengths around 800 µm (70-80 nm diameter).

The amounts of DA and $CuSO_4 \cdot 5H_2O$ in the coating solution can be decreased to 0.0125 mg/ml and 0.075 mg/ml, respectively. The resulting CNT agglomerates are less sticky and can be more easily (pre-) compressed.

Other coating protocols may be followed, e.g. those disclosed in WO 2020/043590 A1.

B. Preparation of a CNT Agglomerate (in the Form of a Layer)

20 ml of the ethanol solution, produced as described above, containing 0.25 g/ml of the CNTs coated with Pda crosslinked with copper ions, was filtrated on a PTFE (polytetrafluoroethylene) membrane (5 cm diameter). The CNT agglomerate obtained by filtration was recovered by peeling. The CNT agglomerate was compressed at 400 $kg/cm^2$ during 5 min.

Alternatively, CNT agglomerates could be obtained by spraying a dispersion of the Pda-coated CNT on a substrate. In case the metal phase is to be produced by electrodeposition, the substrate could be the working electrode of the electrodeposition step or a porous membrane. The substrate could also be a temporary substrate, from which the layer is removed after formation. Examples of CNT layer preparation by spray coating are described in detail in WO 2020/043590 A1.

C. Pre-Compression of the CNT Agglomerate

The decrease of porosity in the CNT agglomerate during the pre-compression step is dependent of the pressure applied (max pressure tested: 800 $kg/cm^2$).

Figure 3:
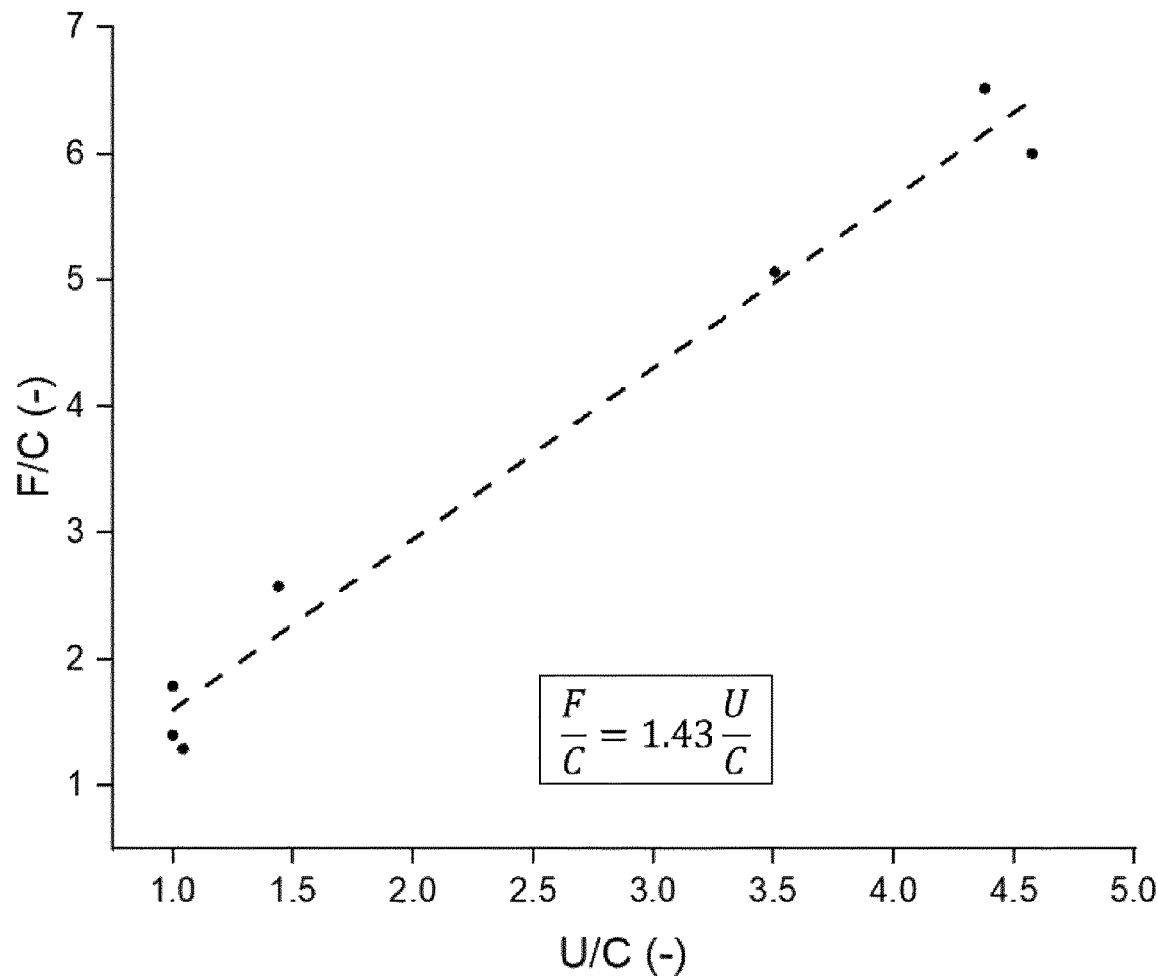
FIG. 3: is a graph showing the swelling of uncompressed CNT agglomerates during electroplating as a function of the degree of pre-compression.

Pre-compression alone of the CNT agglomerate is not sufficient to increase the CNT volume content of the metal-CNT composite. The diagram of FIG. 3 illustrates that the thickness of a CNT layer after electroplating is essentially independent of the degree of pre-compression (when compression is not maintained during the electroplating step): the higher the pre-compression, the greater was the swelling during electroplating.

The diagram was obtained using MWCNT (2.5-8 µm long, 6-13 nm in diameter) and shows the swelling, expressed as the ratio of the CNT layer thickness after electroplating, F, to the CNT layer thickness after any pre-compression but before immersion in the electroplating bath, C, as a function of the compression ratio, i.e. the ratio of the original, uncompressed CNT layer thickness (before any pre-compression), U, to the CNT layer thickness after any pre-compression but before immersion in the electroplating bath, C. It can be seen that F≈1.4 U, independently of the degree of pre-compression.

D. Clamping Appliance Used for Testing

Figure 4:
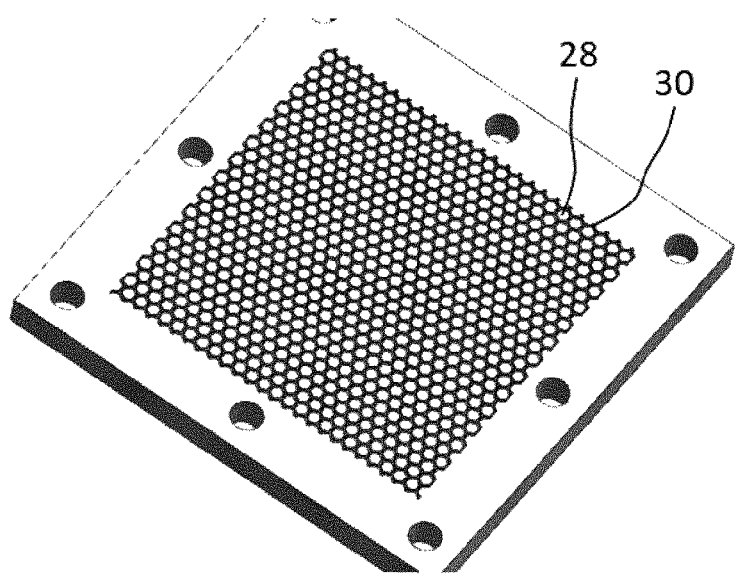
FIG. 4: is a perspective view of an example of the patterned face of a plate of a clamping appliance.

The clamping appliance comprised a patterned plate and a flat supporting plate. FIG. 4 shows the pressure-transfer face of the patterned plate. The recessed areas 30 (forming a hexagonal mesh) are shown in black whereas the raised areas 28 are shown in white. The recessed areas are fluidly connected to passageways allowing passage of the plating solution across the patterned plate. The flat supporting plate was a silicon/$Al_2O_3$ substrate.

E. Fabrication of a Patterned Metal-CNT Composite

The dried CNT agglomerate prepared as described above was clamped between the plates of the clamping appliance. A porous PCA membrane was inserted between the plates and the CNT agglomerate.

Electrical contact with the working electrode terminal was made directly on the CNT agglomerate. The clamping appliance with the fixed CNT agglomerate was immersed in an aqueous copper plating solution ($CuSO_4$ 0.63 M, $H_2SO_4$ 0.1M,—HCl 50 ppm, bis(sodiumsulfopropyl) disulphide 15 ppm, PEG (polyethylene glycol) 100 ppm). Plating was carried out using galvanic pulses (35 $mA/cm^2$/0 mA—ON/OFF—0.02 s/0.1 s) during the time needed to fill the interstices between the CNTs with copper. As used herein, "ppm" means parts per million in terms of mass fraction.

The duration of the electroplating step depends (amongst other parameters) on the level of compression of the CNT agglomerate (more pore volume means more metal to deposit and hence higher deposition time) and CNT layer thickness (in the inventors' experiments, about 3 hours deposition time was needed to obtain a 20 µm thick metal-CNT composite layer).

Figure 5:
FIG. 5: is a photograph of a patterned Cu-CNT composite obtained by the method disclosed herein.

At the end of the electrodeposition step, the deposited copper formed a pattern in the CNT agglomerate. The CNTs present in the areas that were not plated could be rinsed away with water. FIG. 5 is the photograph of a prototype metal-CNT composite shown next to a pen for scale.

A porous membrane can be added between the patterned plate and the CNT agglomerate to enhance the volume percentage CNTs in the patterned composite.

F. Fabrication of a Metal-CNT Composite Foil

A pre-compressed CNT agglomerate produced as described above was placed on a flat titanium substrate covered with a seed layer of copper (100 nm). A porous membrane was placed on top of the CNT layer. A capillary layer (tissue) was added on top of the membrane. A perforated plate was then placed on top of the capillary layer and fixed to the substrate with screws. Electrical contact with the working electrode terminal was taken on the conductive substrate. The clamping appliance with the fixed CNT agglomerate was immersed in an aqueous copper plating solution ($CuSO_4$ 0.63 M, $H_2SO_4$ 0.1 M, HCl 50 ppm, bis(sodiumsulfopropyl) disulphide 15 ppm, PEG 100 ppm). Plating was carried out using galvanic pulses (35 $mA/cm^2$/0 mA—ON/OFF—0.02 s/0.1 s) during the time needed to fill the interstices between the CNTs with copper.

At the end of the plating time, the deposited copper formed a continuous metal phase having the CNTs embedded therein. The capillary layer was removed. The membrane was peeled off the copper-CNT composite foil and the latter was peeled off the titanium substrate.

The porous membrane is susceptible to becoming partially trapped by the metal, which can begin to grow into its pores. Removal of the membrane can be achieved by chemical dissolution (e.g. by immersion in dichloromethane in case of a polycarbonate membrane) and/or by mechanical polishing (e.g. in case of a PTFE membrane).

G. Calculation of the Volume Percentage of CNTs in the Composite

The volume percentage of CNTs in a metal-CNT composite can be calculated by:

$$CNT\ vol.\ \% = \frac{V_{CNT}}{V_{composite}} \cdot 100 = \frac{V_{composite} - V_{metal}}{V_{composite}} \cdot 100 \quad \text{(Eq. 1)}$$

$$V_{metal} = \frac{m_{metal}}{\gamma_{metal}} = \frac{m_{composite} - m_{CNT}}{\gamma_{metal}} \quad \text{(Eq. 2)}$$

where:
$V_{composite}$ is the measured volume of the composite (e.g. in $cm^3$),
$V_{metal}$, obtained by Eq. 2, is the volume of the metal contained in the composite,
$m_{composite}$ is the measured mass of the composite (e.g. in g),
$m_{CNT}$ is the measured mass of the (dry) CNT agglomerate before plating (e.g. in g)

$\gamma_{metal}$ is the specific mass of the metal (e.g. in g/cm³),

In case of a metal-CNT composite in the form of a layer, the volume percentage of CNTs in the composite can, alternatively, be calculated using the following equations:

$$\frac{\sigma_{composite} - \sigma_{CNT}}{\gamma_{metal}} = t_{metal} \quad \text{(Eq. 1)}$$

$$t_{composite} - t_{metal} = t_{CNT} \quad \text{(Eq. 2)}$$

$$CNT\ vol\ \% = \frac{t_{CNT}}{t_{composite}} \cdot 100 \quad \text{(Eq. 3)}$$

where:

$\sigma_{composite}$ is the measured surface density of the composite (e.g. in g/cm²), $\sigma_{CNT}$ is the measured surface density of the (dry) CNT layer before plating (e.g. in g/cm²), $\gamma_{metal}$ is the specific mass of the metal (e.g. in g/cm³), $t_{composite}$ is the measured thickness of the composite, $t_{metal}$, as obtained from Eq. 1 is the equivalent thickness of the metal inside the composite, and $t_{CNT}$, as obtained from Eq. 2, is the equivalent thickness of CNTs inside the composite.

H. Results

Figure 6:
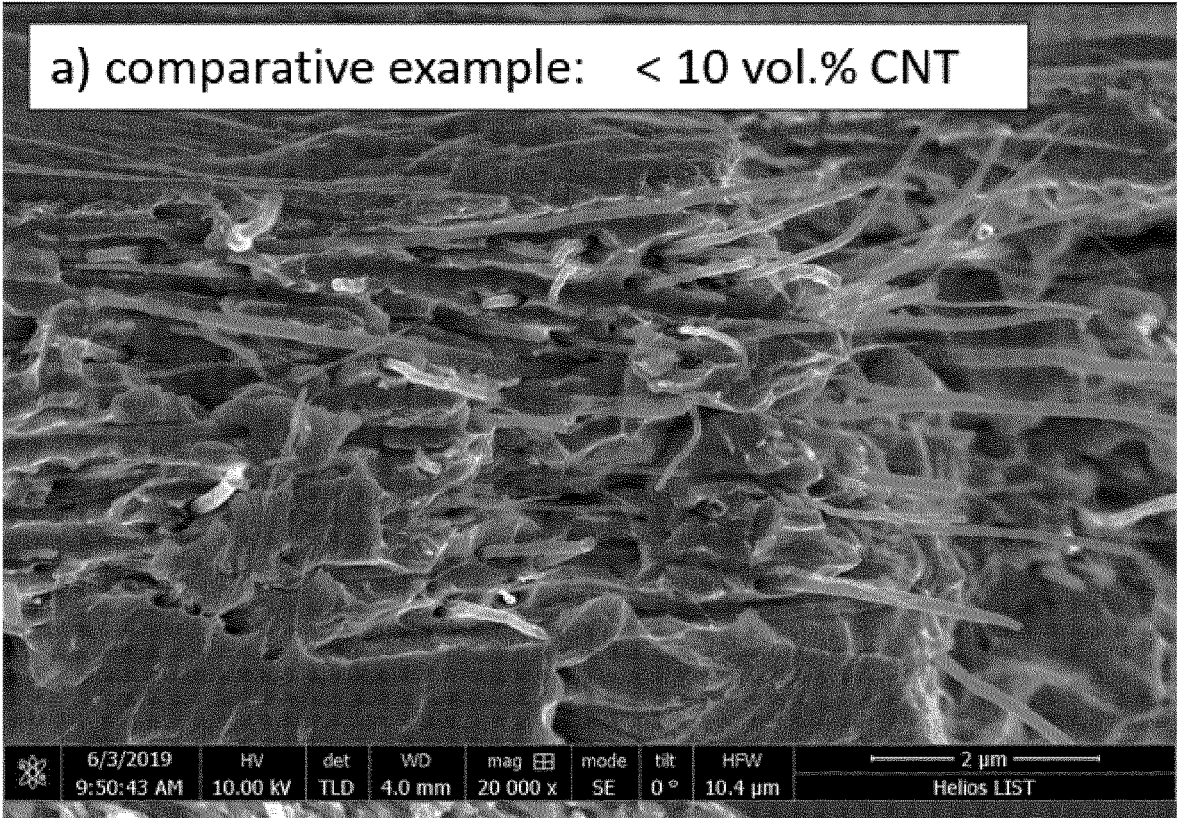
FIG. 6: shows SEM pictures of a) a metal-CNT composite obtained without using a clamping appliance (comparative example) and b) a metal-CNT composite obtained by using a clamping appliance.
Figure 6:
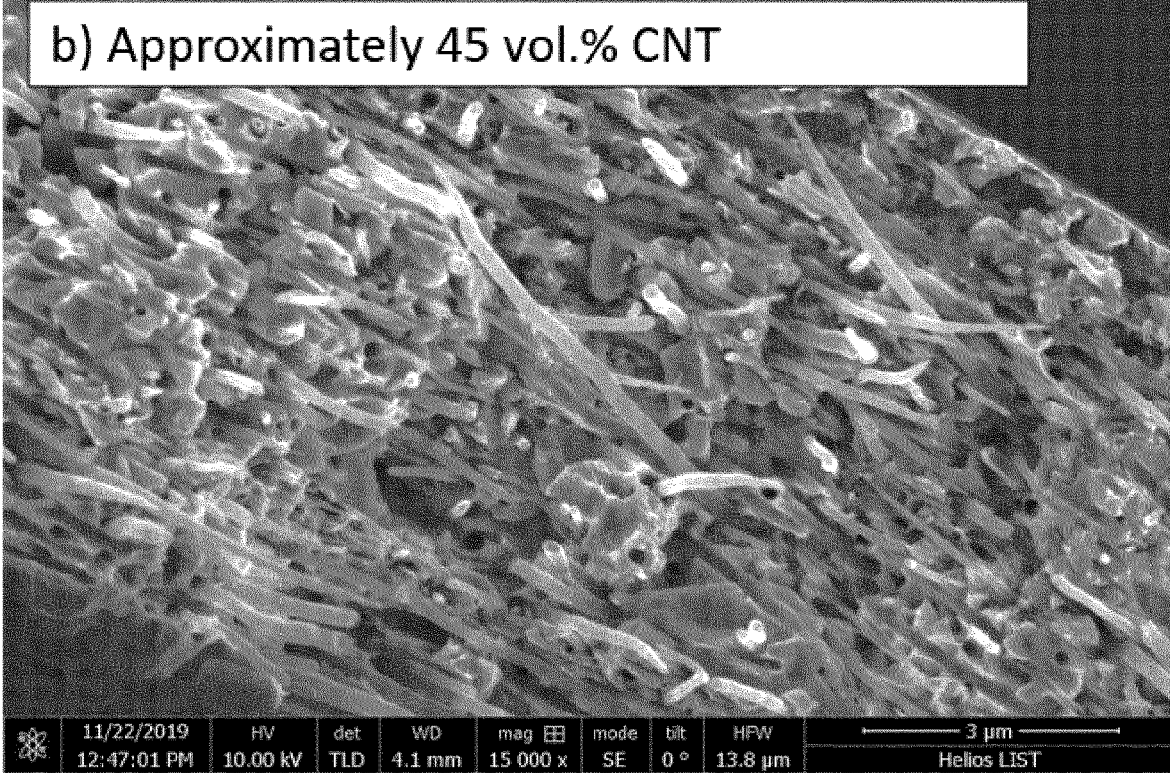

Continuous metal-CNT composites with high volume percentages of CNTs could be obtained by the method described above. The same plating processes carried out without compressing the CNT agglomerate led to composites with less than 10% by volume of CNTs therein (cf. FIG. 6). Furthermore, it was observed that, without using the compressive system, the thickness of the resulting composites was independent of the level of pre-compression of the CNT agglomerates, meaning that if the CNT agglomerate is more compressed, then the swelling is more important. In contrast, when the CNT agglomerates were compressed during electroplating, the swelling was suppressed, i.e. the thickness of the CNT agglomerates remained essentially constant during the electroplating step.

While specific embodiments have been described herein in detail, those skilled in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

The invention claimed is:

1. A method for producing a metal-CNT composite material, comprising:
providing an agglomerate of carbon nanotubes;
filling interstices of the carbon nanotubes agglomerate in a plating solution, so as to form a metal phase, in which the carbon nanotubes are embedded;
wherein the carbon nanotubes agglomerate is compressed with a clamping appliance when the metal phase is formed in the plating solution.

2. The method as claimed in claim 1, wherein the compression of the carbon nanotubes agglomerate inhibits or prevents swelling of the carbon nanotubes agglomerate during formation of the metal phase.

3. The method as claimed in claim 1, wherein the carbon nanotubes comprise a hydrophilic coating.

4. The method as claimed in claim 3, wherein the hydrophilic coating comprises polydopamine.

5. The method as claimed in claim 1, wherein the hydrophilic coating comprises polyphenol or poly(catecholamine) and at least one of metal ions crosslinking the polyphenol or the poly(catecholamine) and metal ions chelated by the polyphenol or the poly(catecholamine).

6. The method as claimed in claim 1, wherein the metal comprises copper.

7. The method as claimed in claim 1, wherein the clamping appliance comprises a first and a second plate holding the carbon nanotubes agglomerate there between.

8. The method as claimed in claim 7, wherein at least one of the first and a second plates comprises passageways for the plating solution.

9. The method as claimed in claim 8, wherein at least one of the first and second plates comprises a patterned pressure-transfer face turned towards the carbon nanotubes agglomerate, the patterned pressure-transfer face comprising raised areas and recessed areas, the recessed areas communicating with the passageways.

10. The method as claimed in claim 7, comprising arranging a membrane between at least one of the first and second plates and the carbon nanotubes agglomerate, the membrane being permeable for the plating solution.

11. The method as claimed in claim 1, wherein filling the interstices of the carbon nanotubes agglomerate in the plating solution is carried out by electroplating.

12. The method as claimed in claim 1, wherein filling the interstices of the carbon nanotubes agglomerate is carried out under sonication.

13. A method for producing a metal-CNT composite material, comprising:
providing an agglomerate of carbon nanotubes;
filling interstices of the carbon nanotubes agglomerate in a plating solution, so as to form a metal phase, in which the carbon nanotubes are embedded;
wherein the carbon nanotubes agglomerate is compressed with a clamping appliance when the metal phase is formed in the plating solution;
wherein the clamping appliance comprises a first and a second plate holding the carbon nanotubes agglomerate there between;
wherein at least one of the first and a second plates comprises passageways for the plating solution;
wherein at least one of the first and second plates comprises a patterned pressure-transfer face turned towards the carbon nanotubes agglomerate, the patterned pressure-transfer face comprising raised areas and recessed areas, the recessed areas communicating with the passageways; and
wherein compression of the carbon nanotubes agglomerate is effected at least predominantly via the raised areas, leading to higher compaction in regions of the carbon nanotubes agglomerate opposite the raised areas, to less compaction in regions of the carbon nanotubes agglomerate opposite the recessed areas and to formation of the metal phase at least predominantly within the less compacted regions of the carbon nanotubes agglomerate opposite the recessed areas.

14. The method as claimed in claim 13, comprising releasing the carbon nanotubes agglomerate from the clamping appliance and rinsing the carbon nanotubes from the previously more highly compacted regions less or not impregnated with the metal phase.

15. A metal-CNT composite material, comprising:
an agglomerate of carbon nanotubes embedded in a metal phase occupying interstices of the carbon nanotubes agglomerate; wherein the metal-CNT composite material contains at least 45% by volume of carbon nanotubes, wherein the carbon nanotubes agglomerate includes a mix of short and long carbon nanotubes, at least 30% by weight of the carbon nanotubes being short carbon nanotubes having a length in the range from 2.5 µm to 50 µm and at least 30% by weight of the carbon nanotubes being long carbon nanotubes having a length in the range from 75 µm to 1500 µm.

* * * * *